April 18, 1961     A. B. MENZER     2,980,574
PLASTIC SHEET MATERIAL
Filed May 28, 1956
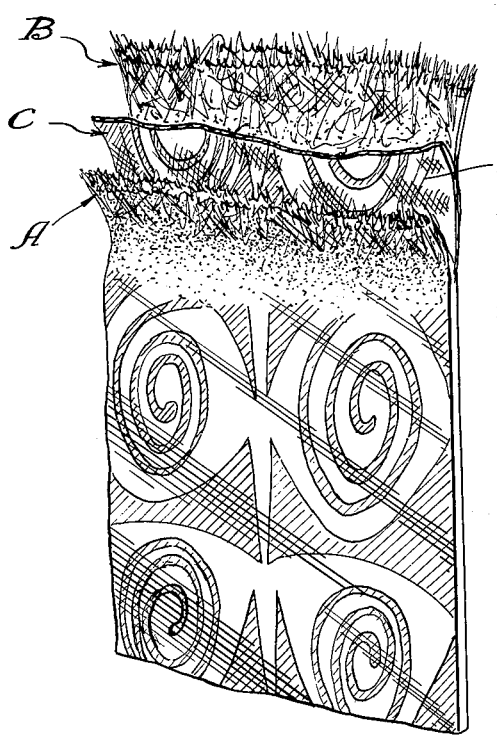
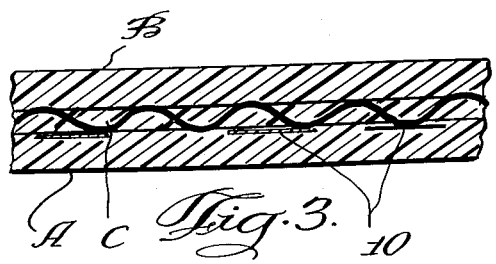
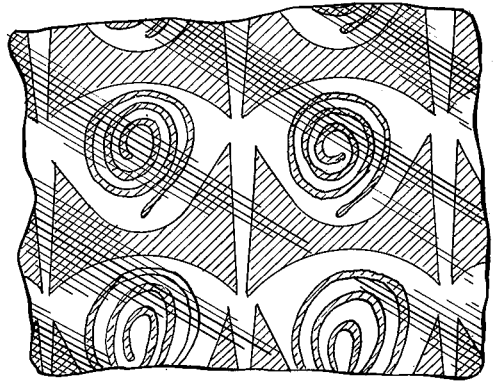
INVENTOR.
Alfred B. Menzer
BY Carl C. Batz
Attorney

2,980,574

PLASTIC SHEET MATERIAL

Alfred B. Menzer, Joliet, Ill., assignor to Kemlite Corporation, Joliet, Ill., a corporation of Illinois Filed May 28, 1956, Ser. No. 587,520

9 Claims. (Cl. 154—128)

This invention relates to a plastic sheet material and more particularly to a laminated plastic sheet material bearing decorative matter such as printing or other treatment to provide a decorative design.

Panels of resin impregnated glass fiber sheets are now in wide use in the building industry. In general, these sheets are made by dipping a sheet of fiberglass into a suitable resin such as a polyester resin so that the resin permeates the sheet; then the impregnated sheet is allowed to cure or set to form a firm strong sheet. The reinforced sheet or panel may be made in various colors by adding coloring material to the resin used in the process. The sheet may be made in varying thicknesses, and may be moulded in various forms prior to setting. The material is tough and strong, relatively light in weight, and can be easily cut or nailed. It is translucent and much of its value in the building field is due to its light transmitting characteristics.

It is a principal object of this invention to provide resin impregnated fiber sheets such as the type above described which carry on their interior an imprint or design of some kind, the imprint or design being protected in use while at the same time being visible from the side of the sheet. Another object is to provide a resin impregnated fiber sheet in laminated form and in which a decorative sheet is disposed between two reinforcing sheets. Another object is to provide a resin impregnated fiber sheet including outer reinforcing sheets and design forming material between these sheets, the sheets being bonded in a unitary structure, but arranged so as to protect the design. Yet another object of the invention is to form such a resin impregnated glass fiber sheet having decorative matter and reinforcing sheets, the sheets being translucent so as to display the decorative matter but without any distinctive display of the individual fibers which make up the sheets. Other objects and advantages of the invention will be apparent as the specification proceeds.

The invention is illustrated in the accompanying drawing wherein one embodiment is shown in Figs. 1 to 4. Fig. 1 is a perspective view of the sheet where the top edge has the various layers turned apart to show the different laminations; Fig. 2 is a fragmentary view in cross section of the sheet illustrated in Fig. 1, prior to impregnation; Fig. 3 is a view in cross section similar to Fig. 2, but after impregnation with resin; and Fig. 4 is a fragmentary view in elevation of the sheet shown in Fig. 1.

As illustrated in Figs. 1 to 4, the improved structure includes a pair of reinforcing sheets A and B, sheet A being the front sheet shown in Fig. 1, and B being the back sheet. Between sheets A and B is a center sheet C which is printed with a design on its front face.

Reinforcing sheets A and B are made of glass fibers arranged in crossed relation so as to form a matted structure. These sheets are flexible in the untreated form and may be purchased from glass manufacturers in the form of a large roll. Various thicknesses may be obtained depending on the desired thickness of the lamination in the finished product.

Instead of the fiberglass sheet above described, other fibrous sheets may be used; for example, sheets of polyester fiber such as Dacron (a filamentized polyester), in woven or unwoven form, or other synthetic fibers, such as acrylics, cellulose acetates, or nylon.

In the manufacture of my improved structure I may place a sheet A on a supporting surface, and on top of this I place the sheet C which bears the printed matter 10 which makes the design. Over sheet C I place the sheet B, which is similar to sheet A. Thus assembled, the three sheets may be dipped or otherwise passed through the resin liquid to impregnate the whole structure, after which the impregnated sheet is allowed to set or cure. Suitably the sheet is put in a heated chamber to accelerate the setting operation. The dipping step may be efficiently performed by passing the assembled layers together through a bath of the resin and then between a pair of squeeze rollers which serve to remove excess resin and to make the thickness of the sheet more uniform.

The resin which is employed in the impregnation of the fiber sheets may suitably be a polyester, epoxy, rigid vinyl, acrylic, or other thermosetting or thermoplastic resin. To give full effect to the invention the resin should be substantially transparent or at least translucent. A specific formulation which gives excellent results is given as follows:

| | Percent |
|---|---|
| Polyester | 50 |
| Styrene | 48 |
| Methyl Methacrylate Monomer | 2 |

Other specific formulations may be used in line with the information already known to the art dealing with resin impregnated materials.

It is a further feature of my invention, however, that the resin and the fiber sheets be selected so that the fiber sheets have substantially the same refractive index as the resin when set. I find that this condition is necessary to make the design clearly apparent and distinct and to avoid interference of visible fibers with the clear perception of the design. It will be recognized that in my improved structure the design is seen through the fiber structure and it is therefore important to facilitate undistorted light transmission through sheet A or B so as to properly reflect from the markings of the design, and also it is important that sheet C permit light transmission so as to pass light through the laminated structure at the unshaded or lightly shaded portions of the design. Accordingly, it is important that the fibrous structure making up each of sheets A, B, and C have a refractive index which is similar to that of the resin material in set condition. By having the fiber sheet C matched as to refractive index with the resin, I provide a finished laminated product of translucent character through which light may pass in varying manner while still presenting the design without any appearance of the center sheet on which the print is carried. The finished sheet, then, appears to be made of a unitary plastic sheet with the ink or other shading or coloring substance embedded in the center.

In the case of a modification such as illustrated in Fig. 1, I prefer that the printing ink or other design forming material be graduated in its ability to transmit light rather than completely opaque, so that I may obtain the advantage of different tones as well as that of complete contrast between dark and light. In this way I am able to obtain particularly desirable effects in response to a light source from the back side of the panel.

I find it particularly advantageous to make the outer layers A and B, of a strong fibrous material such as fiberglass which with the polyester resin provides extra strong reinforcement and strength to the laminated sheet, while the center sheet C may be of a light fibrous material such as rayon (a filamentized acetate) or Dynel (a filamentized polymer of acrylonitrile and vinyl chloride) which is especially suited for carrying a decorative print. In this way I provide a panel which is very desirable both from the standpoint of decorative appearance and strength. I also provide translucence and effective light transmission without the tendency to break or shatter as would be the case with glass.

Also, it will be understood, that although only certain modifications of the invention have been described in detail herein, many changes and alterations may be made in line with the spirit of this disclosure and the skill of the art without departing from the invention.

I claim:

1. A laminated structure comprising a pair of fiberglass sheets, a center fiber sheet interposed between said pair of sheets and carrying on one side thereof a printed design, each of said sheets being impregnated with resin and each having substantially the same refractive index as said resin whereby the fibers of said sheets are minimized in appearance and said design is made clearly apparent from each side of said structure.

2. A laminated structure comprising a pair of fiberglass reinforcing sheets, a center sheet of fibers which are a polymer of acrylonitrile and vinyl chloride, said center sheet being printed on one side and being disposed between said fiberglass sheets, said sheets being impregnated with resin so as to form a unitary laminated structure, said resin having a refractive index which is substantially the same as the fibers in said fiberglass sheets and the same also as the fibers in said center sheet, whereby to provide outer layers of said structure which are translucent and in which the appearance of individual fibers is minimized and said printing is rendered visible from each side of the structure.

3. A process for preparing a translucent reinforced plastic sheet comprising placing between two fiberglass sheets as a fibrous sheet having a printed design on one side thereof, impregnating the assembled sheets with a resin having a refractive index similar to that of said fabric sheet and the fibers of said glass sheets, and curing the impregnated structure to set said resin.

4. A process as set forth in claim 3 in which said sheets are impregnated by passing them through a bath of polyester resin.

5. A structure as set forth in claim 1 wherein said design is of material which is graduated in its ability to transmit light so as to present different tones in the design when light passes through the structure.

6. A structure as set forth in claim 1 wherein said fiberglass sheets are of strong fibrous material to provide strength and reinforcement and said center fiber sheet is of light fibrous material for carrying the design.

7. A structure as set forth in claim 1 wherein the resin is a polyester resin.

8. A process for preparing a translucent reinforced plastic sheet comprising placing between two fiberglass sheets a fibrous sheet having a printed design on one side thereof, impregnating the assembled sheets with a resin having a refractive index similar to that of said fabric sheet and the fibers of said glass sheets, subjecting the impregnated assembled sheets to pressure to render the lamination uniform in thickness and remove excess liquid resin, and curing the pressed impregnated structure to set said resin.

9. A process as set in claim 8 in which the impregnated assembled sheets are subjected to pressure by passing them between rollers.

References Cited in the file of this patent

UNITED STATES PATENTS

| | | |
|---|---|---|
| 2,311,613 | Slayter | Feb. 16, 1943 |
| 2,554,363 | Glaser et al. | May 22, 1951 |
| 2,620,853 | Boese | Dec. 9, 1952 |
| 2,688,580 | Fingerhut | Sept. 7, 1954 |
| 2,712,514 | English | July 5, 1955 |
| 2,801,198 | Morris | July 30, 1957 |
| 2,810,426 | Till et al. | Oct. 22, 1957 |
| 2,827,414 | Bussard | Mar. 18, 1958 |
| 2,871,152 | Tobin | Jan. 27, 1959 |
| 2,905,580 | Kreier | Sept. 22, 1959 |

FOREIGN PATENTS

| | | |
|---|---|---|
| 617,103 | Great Britain | Feb. 1, 1949 |

UNITED STATES PATENT OFFICE
CERTIFICATE OF CORRECTION

Patent No. 2,980,574                        April 18, 1961

Alfred B. Menzer

It is hereby certified that error appears in the above numbered patent requiring correction and that the said Letters Patent should read as corrected below.

Column 3, line 43, strike out "as"; column 4, lines 1 and 20, for "fabric", each occurrence, read -- fibrous --.

Signed and sealed this 27th day of November 1962.

(SEAL)
Attest:
ESTON G. JOHNSON
Attesting Officer

DAVID L. LADD
Commissioner of Patents